(12) United States Patent
Im et al.

(10) Patent No.: US 11,753,693 B2
(45) Date of Patent: *Sep. 12, 2023

(54) HIGH-STRENGTH COLD ROLLED STEEL SHEET HAVING HIGH HOLE EXPANSION RATIO, HIGHSTRENGTH HOT-DIP GALVANIZED STEEL SHEET, AND MANUFACTURING METHODS THEREFOR

(71) Applicant: POSCO, Pohang-si (KR)

(72) Inventors: Young-Roc Im, Gwangyang-si (KR); Jong-Chan Park, Gwangyang-si (KR); Jai-Hyun Kwak, Gwangyang-si (KR); Min-Seo Koo, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/280,524

(22) PCT Filed: Sep. 27, 2019

(86) PCT No.: PCT/KR2019/012563
§ 371 (c)(1),
(2) Date: Mar. 26, 2021

(87) PCT Pub. No.: WO2020/067752
PCT Pub. Date: Apr. 2, 2020

(65) Prior Publication Data
US 2022/0033926 A1  Feb. 3, 2022

(30) Foreign Application Priority Data

Sep. 28, 2018 (KR) .................. 10-2018-0116416
Sep. 23, 2019 (KR) .................. 10-2019-0117044

(51) Int. Cl.
| | | |
|---|---|---|
| B32B 15/01 | (2006.01) | |
| C21D 9/46 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/48 | (2006.01) | |
| C22C 38/50 | (2006.01) | |
| C22C 38/54 | (2006.01) | |
| C22C 38/58 | (2006.01) | |
| C23C 2/06 | (2006.01) | |
| C23C 2/40 | (2006.01) | |

(52) U.S. Cl.
CPC ............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/06* (2013.01); *C23C 2/40* (2013.01); *C21D 2211/001* (2013.01); *C21D 2211/002* (2013.01); *C21D 2211/003* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2008/0283154 A1 | 11/2008 | Taniguchi et al. | |
| 2013/0295402 A1* | 11/2013 | Oh ..................... | C22C 38/14 148/333 |

(Continued)

FOREIGN PATENT DOCUMENTS

| | | |
|---|---|---|
| CN | 102839332 | 12/2012 |
| CN | 103266272 | 8/2013 |

(Continued)

OTHER PUBLICATIONS

Merriam-Webster, "Dictionary: galvanized", accessed online Oct. 18, 2022 at www.merriam-webster.com/dictionary/galvanized (Year: 2022).*

(Continued)

*Primary Examiner* — Humera N. Sheikh
*Assistant Examiner* — Kim S. Horger
(74) *Attorney, Agent, or Firm* — CANTOR COLBURN LLP

(57) ABSTRACT

Provided is a high-strength cold rolled steel sheet, a high-strength hot-dip galvanized steel sheet manufactured using the cold rolled steel sheet, and manufacturing methods therefor, the high-strength cold rolled steel sheet comprising, by wt %, 0.17-0.21% of carbon (C), 0.3-0.8% of silicon (Si), 2.7-3.3% of manganese (Mn), 0.3-0.7% of chromium (Cr), 0.01-0.3% of aluminum (Al), 0.01-0.03% of titanium (Ti), 0.001-0.003% of boron (B), 0.04% or less of phosphorus (P), 0.02% or less of sulfur (S), 0.01% or less of nitrogen (N) and the balance of iron (Fe) and other inevitable impurities, wherein the amounts of carbon (C), silicon (Si) and aluminum (Al) satisfy the following mathematical relation (1). [Mathematical relation (1)] $[C]+([Si]+[Al])/5 \leq 0.35\%$ (wherein [C], [Si] and [Al] respectively mean the wt % of C, Si and Al.)

5 Claims, No Drawings

(56) References Cited

U.S. PATENT DOCUMENTS

| | | | |
|---|---|---|---|
| 2014/0342184 A1 | 11/2014 | Takagi et al. | |
| 2015/0203947 A1 | 7/2015 | Hasegawa et al. | |
| 2016/0186282 A1 | 6/2016 | Han et al. | |
| 2017/0321297 A1 | 11/2017 | Takashima et al. | |
| 2018/0371570 A1* | 12/2018 | Kim | C21D 9/46 |
| 2019/0003002 A1 | 1/2019 | Seo | |
| 2019/0119774 A1 | 4/2019 | Thiessen et al. | |
| 2019/0211427 A1 | 7/2019 | Sano et al. | |
| 2020/0024709 A1 | 1/2020 | Yokoyama et al. | |
| 2020/0190612 A1 | 6/2020 | Kwak et al. | |

FOREIGN PATENT DOCUMENTS

| | | | |
|---|---|---|---|
| CN | 103993147 | 8/2014 | |
| CN | 103993148 | 8/2014 | |
| CN | 104928577 | 9/2015 | |
| CN | 108251754 | 7/2018 | |
| EP | 2258887 A1 | 12/2010 | |
| EP | 2831296 A1 | 2/2015 | |
| EP | 3292228 A1 | 3/2018 | |
| JP | 3894703 | 3/2007 | |
| JP | 2007070659 | 3/2007 | |
| JP | 2012031462 | 2/2012 | |
| JP | 2014034716 | 2/2014 | |
| JP | 2016050343 | 4/2016 | |
| KR | 20060103480 | 9/2006 | |
| KR | 20100047022 | 5/2010 | |
| KR | 20120074798 | 7/2012 | |
| KR | 20130036752 | 4/2013 | |
| KR | 20140083286 | 7/2014 | |
| KR | 20150029736 | 3/2015 | |
| KR | 20170071658 | 6/2017 | |
| KR | 20170075796 | 7/2017 | |
| KR | 101858852 | 6/2018 | |
| WO | 2013099235 | 7/2013 | |
| WO | 2017105025 A1 | 6/2017 | |
| WO | 2017109541 A1 | 6/2017 | |
| WO | WO-2017105064 A1 * | 6/2017 | B32B 15/013 |
| WO | 2018055687 | 3/2018 | |
| WO | 2018179386 | 10/2018 | |

OTHER PUBLICATIONS

Japanese Office Action—Japanese Application No. 2021-516770 dated May 10, 2022, citing JP 2016-050343, JP 2012-031462, JP 2020-509177, WO 2018/179386, WO 2013/099235, US 2016/0186282, KR 10-2013-0036752, and WO 2018/055687.

International Search Report—PCT/KR2019/012563 dated Jan. 7, 2020.

Chinese Office Action—Chinese Application No. 201980063783.9 dated Sep. 3, 2021, citing KR 10-2012-0074798, KR 10-2014-0083286, KR 10-1858852, JP 3894703, KR 10-2010-0047022, CN 103993147, CN 103266272, CN 108251754, CN 103993148, and CN 102839332.

EP Extended Search Report dated Nov. 16, 2021 re: Application No. PCT/KR2019/012563, pp. 1-15, citing: No. 2017/109541 A1, EP 2 258 887 A1, EP 2 831 296 A1, EP 3 292 228 A1, WO 2017/105025 A1, K. Hausmann et al. "Trip-Aided . . . ", S. Pashangeh et al., "Detection and Estimation . . . ", S. Magner et al. "A Historical Review . . . ".

K. Hausmann, et al., "Trip-aided bainitic-ferritic sheet steel: A critical assessment of alloy design and heat treatment", Proceedings of Materials Science & Technology, Montreal, QC, Canada, Oct. 27-31, 2013, Minerals, Metals & Materials Society, Warrendale, PA., USA, Jan. 1, 2013, pp. 209-218.

S. H. Magner, et al., "A historical review of retained austenite and its measurement by X-ray diffraction", Advances in X-ray analysis, vol. 45, Jan. 1, 2002, pp. 92-97.

Shima Pashangeh, et al., "Detection and estimation of retained austenite in a high strength Si-bearing Bainite-Martensite-retained austenite micro-composite steel after quenching an bainitic holding (Q&B)", Metals, vol. 9, No. 5, Jan. 1, 2019, p. 492.

Incorporated Association Iron and Steel Institute of Japan Joint Research Meeting, steel plate group, cold strip subgroup, "Recent Advancement in Cold Strip Facility and Manufacturing Technology in Our Country", Incorporated Association Iron and Steel Institute of Japan, Aug. 1977, p. 148.

Japanese Office Action—Japanese Application No. 2021-516770 dated Jun. 6, 2023, citing "Recent Advancement In Cold Strip Facility and Manufacturing Technology in Our Country".

\* cited by examiner

HIGH-STRENGTH COLD ROLLED STEEL SHEET HAVING HIGH HOLE EXPANSION RATIO, HIGHSTRENGTH HOT-DIP GALVANIZED STEEL SHEET, AND MANUFACTURING METHODS THEREFOR

TECHNICAL FIELD

The present disclosure relates to a high-strength cold rolled steel sheet and high-strength hot-dip galvanized steel sheet having a high hole expansion ratio, and a manufacturing method thereof.

BACKGROUND ART

In recent years, development of a technology of manufacturing a steel sheet having high strength has been promoted to reduce the weight of automobiles. A steel sheet having both high strength and formability may increase productivity, so it is excellent in terms of economy and is more advantageous in terms of safety of final parts. In particular, demand for steel having high tensile strength (TS) of 1180 MPa or higher has increased because a steel sheet having high tensile strength (TS) has a high bearing load until fracture occurs. In the related art, many attempts have been made to improve strength of the existing steel, but it was found that simple improvement of the strength degrades ductility and hole expansion ratio (HER). Meanwhile, transformation induced plasticity (TRIP) steel sheet in which a large amount of Si or Al is added may be a related art which overcomes the aforementioned shortcomings. However, in the case of TRIP steel sheet, it is possible to obtain an elongation of 14% or more at TS 1180 MPa class but liquid metal embrittlement (LME) resistance is deteriorated due to the addition of a large amount of Si and Al, which leads to poor weldability, and thus, commercialization of TRIP steel sheet as a material for automobile structures is limited.

In addition, various yield ratios are pursued in the same tensile strength class according to usages and purposes, and it is not easy to produce a steel having high hole expansion ratio with a steel sheet having a low yield ratio. The reason is because it is usually necessary to introduce a martensite or ferrite phase as a second phase to lower a yield ratio but such a structural characteristics is a factor that impairs the hole expansion ratio.

Patent document 1 discloses a high-strength cold rolled steel sheet having yield ratio, strength, hole expansion ratio, delayed fracture resistance characteristics and having a high elongation of 17.5% or more. However, Patent document 1 has a disadvantage in that weldability is poor due to an occurrence of LME due to a high Si addition.

Therefore, the present disclosure proposes a 1180 MPa-class steel material exhibiting high strength and excellent hole expansion ratio of 25% or more, elongation of 5% to 13%, and excellent weldability even at a low yield ratio, and a manufacturing method thereof.

RELATED ART DOCUMENT (Patent document 1) Korean Patent Laid-open Publication No. 2017-7015003

DISCLOSURE

Technical Problem

An aspect of the present disclosure may provide a high-strength cold rolled steel sheet having elongation suitable for machining, a high hole expansion ratio, and good weldability, while having a high strength and a low yield ratio, a high-strength hot-dip galvanized steel sheet manufactured using the same, and a manufacturing method thereof.

Technical objects to be achieved by the present invention are not limited to the aforementioned technical objects, and other technical objects not described above may be evidently understood by a person having ordinary skill in the art to which the present invention pertains from the following description.

Technical Solution

According to an aspect of the present disclosure, a high-strength cold rolled steel sheet may include, by weight percent (wt %), 0.17 to 0.21% of carbon (C), 0.3 to 0.8% of silicon (Si), 2.7 to 3.3% of manganese (Mn), 0.3 to 0.7% of chromium (Cr, 0.01 to 0.3% of aluminum (Al), 0.01 to 0.03% of titanium (Ti), 0.001 to 0.003% of boron (B), 0.04% or less of phosphorus (P), 0.02% or less of sulfur (S), 0.01% or less of nitrogen (N), the balance of iron (Fe), and other inevitable impurities, wherein the contents of carbon (C), silicon (Si), and aluminum (Al) satisfy Equation 1 below, a microstructure thereof includes (by area fraction, 3 to 7 of retained to 15% of fresh martensite, 5 or less (including 0%) of ferrite, and the balance of bainite or tempered martensite, and, by volume fraction, 1 to 3% of a cementite phase, as a second phase, is precipitated and distributed between bainite laths or in the laths or grain boundary of a tempered martensite phase, $$[C]+([Si]+[Al])/5 \leq 0.35\% \quad \text{[Equation (1)]}$$

wherein [C], [Si], [Al] refer to weight percents of C, Si, and Al, respectively.

The cold rolled steel sheet may further include 0.1% or less of copper (Cu), 0.1% or less of nickel (Ni), and 0.1% or less of molybdenum (Mo).

The cold rolled steel sheet may further include 0.03% or less of niobium (Nb) and 0.01% of less of vanadium (V).

The cold rolled steel sheet may have a tensile strength of 1180 MPa or more, a yield ratio of 0.65 to 0.85, a hole expansion ratio of 25% or more (HER), and an elongation of 5 to 13%.

According to another aspect of the present disclosure, a high strength hot-dip galvanized steel sheet may further include a hot-dip zinc plating layer on a surface of the high-strength cold rolled steel sheet described above.

The high strength hot-dip galvanized steel sheet may further include an alloyed hot-dip zinc plating layer on a surface of the high-strength cold rolled steel sheet described above.

According to another aspect of the present disclosure, a method of manufacturing a high-strength cold rolled steel sheet may include: preparing a slab including, by weight percent (wt %), 0.17 to 0.21% of carbon (C), 0.3 to 0.8% of silicon (Si), 2.7 to 3.3% of manganese (Mn), 0.3 to 0.7% of chromium (Cr, 0.01 to 0.3% of aluminum (Al), 0.01 to 0.03% of titanium (Ti), 0.001 to 0.003% of boron (B), 0.04% or less of phosphorus (P), 0.02% or less of sulfur (S), 0.01% or less of nitrogen (N), the balance of Iron (Fe), and other inevitable impurities, wherein the contents of carbon (C), silicon (Si), and aluminum (Al) satisfy Equation A below; heating the slab to a temperature in a range of 1,150° C. to 1,250° C.; finish hot rolling the heated slab within finish delivery temperature (FDT) range of 900° C. to 980° C.; cooling the slab at an average cooling rate of 10° C./sec to 100° C./sec after the finish hot rolling; coiling the slab in a temperature in a Lange of 500° C. to 700° C.; rolling the slab at a cold-rolling reduction ratio of 30% to 60% to obtain a cold rolled steel sheet; continuously annealing the cold rolled steel sheet at a temperature in a range of (Ae3+30° C. to Ae3+80° C.); primarily cooling the continuously annealed steel sheet at an average cooling rate of 10° C./s or less to a temperature in a range of 560° C. to 700° C. and secondarily cooling the steel sheet at an average cooling rate of 10° C./s or more to a temperature in a range of 270° C. to 330° C.; and reheating the cooled steel sheet at a temperature increase rate of 5° C./s or lower to a temperature in a range of 380° C. to 460° C.

$$[C]+([Si]+[Al])/5 \leq 0.35\% \quad \text{[Equation (1)]}$$

wherein [C], [Si], and [Al] refer to weight percent of C, Si, and Al, respectively.

The slab may further include 0.1% or less of copper (Cu), 0.1% or less of nickel (Ni), and 0.1% or less of molybdenum (Mo).

The slab may further include 0.03% or less of niobium (Nb) and 0.01% or less of vanadium (V).

The continuous annealing may be performed at a temperature in a range of 830° C. to 880° C.

According to another aspect of the present disclosure, a method of manufacturing a high strength hot-dip galvanized steel sheet may further include: performing hot-dip zinc plating on the reheated cold rolled steel sheet at a temperature in a range of 430° C. to 490° C.

After the hot-dip zinc plating, annealing for alloying may be performed, and cooling may then be performed to room temperature.

After cooling to the room temperature, temper rolling less than 1% may be performed.

Advantageous Effects

According to exemplary embodiments in the present disclosure, a high-strength cold rolled steel sheet and hot-dip galvanized steel sheet having a high hole expansion ratio of 25% or more and an elongation of 5% to 13%, while having high tensile strength of 1180 MPa or more and a low yield ratio of 0.65 to 0.85, may be provided.

In addition, the high-strength hot-dip galvanized steel sheet of the present disclosure has characteristics that exhibit excellent weldability due to excellent LME resistance after galvanizing.

BEST MODE

The terminology used herein is for reference only to specific embodiments and is not intended to limit the present disclosure. Singular forms as used herein also include plural forms unless obviously indicate otherwise.

As used in the disclosure, the meaning of "including" specifies a specific characteristics, regions, integers, steps, operations, elements and/or components, and do not exclude presence or addition of other specific characteristics, regions, integers, steps, operations, elements, components and/or groups.

Unless indicated otherwise, it is to be understood that all the terms used in the specification, including technical and scientific terms have the same meaning as those that are understood by those skilled in the art to which the present invention pertains. It must be understood that the terms defined by the dictionary are identical with the meanings within the context of the related art, and they should not be ideally or excessively formally defined unless the context clearly dictates otherwise.

Hereinafter, a high-strength cold rolled steel sheet and a high strength hot-dip galvanized steel sheet according to an aspect of the present disclosure will be described in detail.

First, an alloy composition of a high-strength cold rolled steel sheet provided in the present disclosure will be described in detail. In this case, the content of each component refers to weight % unless otherwise specified.

Carbon (C): 0.17 to 0.21%

Carbon is a basic element that supports strength of steel through solid solution strengthening and precipitation strengthening. If the amount of carbon is less than 0.17%, it is difficult to obtain strength equivalent to tensile strength (TS) of 1180 MPa, while satisfying other materials. Meanwhile, if the amount of carbon exceeds 0.21%, weldability deteriorates and a target hole expansion ratio value cannot be obtained. Therefore, in the present disclosure, the content of carbon is preferably limited to 0.17 to 0.21%. A lower limit of C is more preferably 0.18%, and an upper limit of C is more preferably 0.20%.

Silicon (Si): 0.3 to 0.8%

Silicon is a key element of transformation induced plasticity (TRIP) steel that acts to increase a retained austenite fraction and elongation by inhibiting precipitation of cementite in a bainite region. If silicon is less than 0.3%, the elongation is too low as retained austenite rarely remains. Meanwhile, if silicon exceeds 0.8%, deterioration of physical properties of a weld portion due to formation of LME cracks cannot be prevented and surface characteristics and plating properties of the steel deteriorate. Therefore, in the present disclosure, the content of silicon is preferably limited to 0.3 to 0.8%. A lower limit of Si is more preferably 0.4% and an upper limit of Si is more preferably 0.6%.

Manganese (Mn): 2.7 to 3.3%

In the present disclosure, the amount of manganese may be 2.7 to 3.3%. If the manganese content is less than 2.7%, it is difficult to secure strength, and if the manganese content exceeds 3.3%, a bainite transformation rate is slowed to form too much fresh martensite, making it difficult to obtain high hole expansion ratio. In addition, if the content of manganese is high, a start temperature of martensite formation is lowered and a cooling end temperature required to obtain an initial martensite phase in an annealing water cooling step is too low. Therefore, in the present disclosure, the content of manganese is preferably limited to 2.7 to 3.3%. A lower limit of Mn is more preferably 2.8% and an upper limit of Mn is more preferably 3.1%.

Chromium (Cr): 0.3 to 0.7%

In the present disclosure, the amount of chromium may be 0.3 to 0.7%. If the amount of chromium is less than 0.3%, it is difficult to obtain target tensile strength, and the amount of chromium exceeds an upper limit of 0.7%, a transformation speed of bainite is slow, making it difficult to obtain a high hole expansion ratio. Therefore, in the present disclosure, the content of chromium is preferably limited to 0.3 to 0.7%. A lower limit of Cr is more preferably 0.4% and an upper limit of Cr is more preferably 0.6%.

Aluminum (Al): 0.01 to 0.3%

In the present disclosure, the amount of aluminum may be 0.01 to 0.3%. If the amount of aluminum is less than 0.01%, the steel may not be sufficiently deoxidized and cleanliness is impaired. Meanwhile, the amount of aluminum exceeds 0.3%, castability of the steel is deteriorated. Therefore, in the present disclosure, the content of aluminum is preferably limited to 0.01 to 0.3%. A lower limit of Al is more preferably 0.03% and an upper limit of Al is more preferably 0.2%.

Titanium (Ti): 0.01 to 0.03%, Boron (B): 0.001 to 0.003%

In the present disclosure, 0.01 to 0.03% of titanium and 0.001 to 0.003% of boron may be added to increase hardenability of the steel. If the content of titanium is less than 0.01%, boron may be bonded to nitrogen, so that the effect of strengthening hardenability of boron is lost, and the content of titanium exceeds 0.03%, castability of the steel is deteriorated. Meanwhile, if the content of boron is less than 0.001%, an effective hardenability strengthening effect cannot be obtained, and if boron is contained in excess of 0.003%, a boron carbide may be formed, significantly impairing hardenability. Therefore, in the present disclosure, the content of titanium is preferably limited to 0.01 to 0.03%, and the content of boron is preferably limited to 0.001 to 0.003%. A lower limit of Ti is more preferably 0.015% and an upper limit of Ti is more preferably 0.025%. A lower limit of B is more preferably 0.015% and an upper limit of B is more preferably 0.0025%.

Phosphorus (P): 0.04% or Less

Phosphorus exists as an impurity in the steel and it is advantageous to control its content as low as possible, but phosphorus is also intentionally added to increase strength of the steel. However, if the phosphorus is excessively added, toughness of the steel may be deteriorated. Therefore, in order to prevent this, in the present disclosure, an upper limit may be preferably limited to 0.04%. More preferably, the content of P is 0.01% or less.

Sulfur (S): 0.02% or Less

Like phosphorus, sulfur exists as an impurity in the steel, and it is advantageous to control its content as low as possible. In addition, since sulfur deteriorates ductility and impact properties of the steel, an upper limit is preferably limited to 0.02% or less. The content of S is more preferably 0.003% or less.

Nitrogen (N): 0.01% or Less

In the present disclosure, nitrogen is included in the steel as an impurity, and it is advantageous to control the content of nitrogen as low as possible. If a large amount of nitrogen is added, an excessive amount of nitride may be formed to degrade rollability due to excessive structure refinement, to make it impossible to control a target structure, and to impair final quality such as impact characteristics, etc. Therefore, an upper limit thereof is preferably limited to 0.01% or less. The content of N is more preferably 0.0060% or less.

In addition to the aforementioned alloy composition, the steel sheet of the present disclosure may additionally include 0.1% or less of copper (Cu), 0.1% or less of nickel (Ni), and 0.1% or less of molybdenum (Mo).

Copper (Cu): 0.1% or Less, Nickel (Ni): 0.1% or Less, Molybdenum (Mo): 0.1% or Less Copper, nickel, and molybdenum are elements that increase strength of steel and are included as optional components in the present disclosure, and an upper limit of addition of each element is limited to 0.1%. These elements increase strength and hardenability of steel, but addition of an excessive amount thereof may exceed a target strength class, and since they are expensive elements, an upper limit of their addition is preferably limited to 0.1% in terms of economical efficiency. Meanwhile, since copper, nickel and molybdenum act as solid solution strengthening, an addition thereof less than 0.03% may be too insignificant to achieve solid solution strengthening effect, and therefore, when copper, nickel and molybdenum are added, a lower limit thereof may be limited to 0.03% or more. An upper limit of each of Cu, Ni, and Mo is preferably 0.06%.

In addition to the alloy composition described above, the steel sheet of the present disclosure may additionally include 0.03% or less of niobium (Nb) and 0.01% or less of vanadium (V).

Niobium (Nb): 0.03% or Less, Vanadium (V): 0.01% or Less

Niobium and vanadium are elements that increase yield strength of steel through precipitation hardening and may be optionally added to increase yield strength in the present disclosure. However, excessive content thereof may significantly lower elongation and cause brittleness of the steel, and thus, in the present disclosure, upper limits of niobium and vanadium are limited to 0.03% and 0.01% or less, respectively. Meanwhile, since niobium and vanadium cause precipitation hardening, even a small amount of addition thereof may be effective, but if niobium and vanadium is added less than 0.005%, the effect may be insignificant. Therefore, when niobium and vanadium is added, a lower limit thereof may be limited to 0.005% or more. Upper limits of Nb and V are preferably 0.02% and 0.008%, respectively.

$$[C]+([Si]+[Al])/5 \leq 0.35\% \qquad [\text{Equation (1)}]$$

wherein [C], [Si], [Al] refer to weight percents of C, Si, and Al, respectively.

In addition to the aforementioned contents of C, Si and Al, C, Si, and Al satisfy Equation (1) above. Liquid metal embrittlement (LME) of plated steel occurs as liquid zinc penetrates an austenite grain boundary when tensile stress is formed at an austenite grain interface of the steel sheet in a state in which plated zinc becomes liquid during spot welding. Since the LME phenomenon is particularly severe in the steel sheet to which Si and Al are added, an addition amount of Si and Al is limited through Equation (1) above in the present disclosure. In addition, if the C content is high, an A3 temperature of the steel is lowered to cause an austenite region vulnerable to LME to be expanded and weaken toughness of the material, and thus, the addition amount of C is limited through Equation (1) above.

If the value of Equation (1) exceeds 0.35%, LME resistance is deteriorated during spot welding as described above, and thus, there are LME cracks after the spot welding, which impairs fatigue characteristics and structural safety. Meanwhile, as the value of Equation (1) is smaller, spot weldability and LME resistance are improved, so a lower limit thereof may not be separately set. However, if the value is less than 0.20%, it may be difficult to obtain high tensile strength of 1180 MPa class together with an excellent hole expansion ratio although spot weldability and LME resistance are improved. Therefore, the lower limit may be set to 0.25%.

The remaining component of the present disclosure is iron (Fe). In other ordinary steel manufacturing processes, unintended impurities may inevitably be mixed from raw materials or a surrounding environment. Since these impurities are known to anyone of ordinary skill in the steel manufacturing process, all the contents thereof are not specifically mentioned in the present disclosure.

Meanwhile, the high-strength cold rolled steel sheet of the present disclosure that satisfies the aforementioned steel composition has a microstructure including, by area fraction, 3 to 7% of retained austenite, 5 to 15% of fresh martensite, 5% or less (including 0%) of ferrite, and the balance of bainite or tempered martensite, and a cementite phase, as a second phase, is precipitated and distributed in a bainite lath boundary or in a lath or grain boundary of the tempered martensite, and a volume fraction thereof may be 1 to 3%.

In the high-strength cold rolled steel sheet according to the present disclosure, part of cementite precipitates and grows in the microstructure by limiting the content of Si and Al that stabilizes austenite by inhibiting the growth of cementite, by the condition of Equation (1). This cementite is precipitated in a martensite lath or grain boundary when martensite formed by secondary cooling is reheated, or is formed in a portion in which carbon is concentrated between bainite ferrite laths when bainite transformation occurs during reheating after secondary cooling. In the cold rolled steel sheet according to the present disclosure, cementite having a volume fraction of 1% or more is precipitated by limiting the upper limits of Si and Al by Equation (1), but, nevertheless, austenite remains due to the presence of partial Si and Al and carbon is distributed inside the retained austenite, and thus, the amount of precipitated cementite is less than 3%. In addition, since Si and Al are added to some extent, austenite remains present in the steel of the present disclosure at a level of 3 to 7%, but a high fraction of retained austenite as in typical TRIP steels with very high Si and Al content is not distributed in the steel of the present disclosure.

In addition, in the present disclosure, fresh martensite structure is introduced at a level of 5 to 15% to obtain a low yield ratio. If an austenite phase fraction is high after the secondary cooling and reheating, the carbon content in the austenite is low and stability is insufficient, and part of the austenite is transformed into fresh martensite in a subsequent cooling process, resulting in a lower yield ratio.

In addition, in the present disclosure, the ferrite structure is not desirable for the hole expansion ratio, but may exist at a level of 5% or less (including 0%) during the manufacturing process. In addition, the balance in the microstructure of the present disclosure includes bainite or tempered martensite structure.

By having the alloy components and microstructure as described above, the high-strength cold rolled steel sheet of the present disclosure exhibits a high hole expansion ratio of 25% or more even at a tensile strength of 1180 MPa or more and a low yield ratio of 0.65 to 0.85. As described above, the low yield ratio of the high-strength cold rolled steel sheet according to the present disclosure is due to the introduction of fresh martensite. The inventors of the present application found that more than 25% or more hole expansion ratio even with the fresh martensite under the alloy component and the structure control condition according to the present disclosure. In addition, since the high-strength cold rolled steel sheet according to the present disclosure limits the content of Si and Al, the TRIP effect is weak and an elongation of 5 to 13% is shown.

The present disclosure may also provide a hot-dip galvanized steel sheet obtained by performing a hot-dip galvanizing on a surface of the high-strength cold rolled steel sheet and an alloyed hot-dip galvanized steel sheet obtained by performing annealing for alloying on the hot-dip galvanized steel sheet.

Next, a method of manufacturing a high-strength cold rolled steel sheet and a high strength hot-dip galvanized steel sheet according to another aspect of the present disclosure will be described in detail.

The high-strength cold rolled steel sheet according to the present disclosure may be manufactured by undergoing heating a steel slab satisfying the steel component composition described above—hot rolling—cooling—coiling—cold rolling—continuous annealing—primary and secondary cooling—reheating, and details thereof are as follows.

Steel Slab Preparation and Heating Process

First, a slab having the aforementioned alloy composition and satisfying Equation (1) is prepared and heated to a temperature of 1150° C. to 1250° C. Here, if a slab temperature is less than 1150° C., it may be impossible to perform a next step, hot rolling. Meanwhile, if the slab temperature exceeds 1250° C., a lot of energy is unnecessarily required to increase the slab temperature. Therefore, a heating temperature is preferably limited to a temperature of 1150° C. to 1250° C. A lower limit of the heating temperature is more preferably 1190° C. and an upper limit of the heating temperature is more preferably 1230° C.

Hot Rolling Process

The heated slab is hot-rolled to a thickness suitable for an intended purpose under the condition that a finish delivery temperature (FDT) is 900° C. to 980° C. If the FDT is lower than 900° C., a rolling load is large and shape defects increase, resulting in poor productivity. Meanwhile, if the FDT exceeds 980° C., surface quality deteriorates due to an increase in oxides due to an excessive high-temperature operation. Therefore, hot rolling is preferably performed under the condition that the FDT is 900° C. to 980° C. A lower limit of the FDT is more preferably 910° C. and an upper limit of the FDT is more preferably 950° C.

Coiling Process and Cold Rolling Process

The hot-rolled steel sheet is cooled to a coiling temperature at an average cooling rate of 10° C./s to 100° C./s, and coiling is performed in a typical temperature in a range of 500° C. to 700° C. After coiling, the hot-rolled steel sheet is rolled at a cold-rolling reduction ratio of 30% to 60% to obtain a cold rolled steel sheet. If the average cooling rate is less than 10° C./s, hot rolling productivity may be excessively deteriorated, and if it exceeds 100° C./s, strength of an edge portion increases, thereby increasing a material deviation in a width direction. A lower limit of the average cooling rate is preferably 20° C./s and an upper limit of the average cooling rate is preferably 80° C./s. A lower limit of a temperature for coiling is preferably 550° C. and an upper limit of the temperature for coiling is preferably 650° C. If the cold rolling reduction ratio is less than 30%, it may be difficult to secure target thickness accuracy and it may be difficult to correct a shape of the steel sheet. Meanwhile, if the cold-rolling reduction rate exceeds 60%, a possibility of cracking at the edge of the steel sheet may increase and the cold-rolling load is excessively large. Therefore, in the present disclosure, the cold rolling reduction rate at the cold rolling step is preferably limited to 30 to 60%. A lower limit of the cold-rolling reduction ratio is more preferably 35% and an upper limit of the cold-rolling reduction ratio is more preferably 50%.

Continuous Annealing Process

In the present disclosure, the cold rolled steel sheet is subjected to continuous annealing in a temperature in a range of (Ae3+30° C. to Ae3+80° C.). More preferably, continuous annealing may be performed in a temperature in a range of 830° C. to 880° C. In addition, the continuous annealing may be carried out in a continuous alloying hot-dip plating furnace. The continuous annealing step is to form austenite close to 100% by heating up to a single phase of austenite and use the austenite for subsequent phase transformation. If the continuous annealing temperature is lower than Ae3+30° C. or less than 830° C., sufficient austenite transformation is not performed, so that desired martensite and bainite fractions cannot be secured after annealing. Meanwhile, if the continuous annealing temperature exceeds Ae3+80° C. or 880° C., productivity may decrease and coarse austenite may be formed, resulting in material deterioration. In addition, oxides may grow during annealing, making it difficult to secure surface quality of a plated material. Ae3 may be calculated using thermodynamic software utilizing a computer coupling of phase diagrams and thermochemistry (CALPHAD) method commonly used in the art.

Primary and Secondary Cooling Process

The continuously annealed steel sheet is primarily cooled at an average cooling rate of 10° C./s or less up to a temperature in a range of 560 to 700° C., and secondarily cooled at an average cooling rate of 10° C./s or more up to a temperature in a range of 270 to 330° C. to introduce martensite. Here, a temperature for terminating the primary cooling may be defined as a time point at which rapid cooling is started by additionally applying a quenching facility that has not been applied in the primary cooling. When a cooling process is divided into primary and secondary cooling and is carried out by stages, a temperature distribution of the steel sheet may become uniform in a slow cooling step to reduce a final temperature and material deviation and it is also advantageous to obtain a required phase composition.

The primary cooling is slow cooling at an average cooling rate of 10° C./s or less, and a cooling end temperature thereof may be in a temperature in a range of 560 to 700° C. If the primary cooling end temperature is lower than 560° C., a ferrite phase is excessively precipitated to deteriorate a final hole expansion ratio. Meanwhile, if it exceeds 700° C., the secondary cooling is excessively loaded and a plate speed of the continuous annealing line has to be slowed, resulting in lower productivity. A lower limit of the primary cooling end temperature is more preferably 580° C. and an upper limit of the primary cooling end temperature is more preferably 670° C.

For the secondary cooling, a quenching facility not applied in the primary cooling may be additionally applied, and a hydrogen quenching facility using $H_2$ gas may be used. Here, it is important to control a secondary cooling end temperature to 270 to 330° C. at which an appropriate initial martensite fraction may be obtained. If the secondary cooling end temperature is lower than 270° C., the initial martensite fraction transformed during the secondary cooling is too high, so that there is no space for obtaining various phase transformations required in a subsequent process and a shape and workability of the steel sheet deteriorate. Meanwhile, if the secondary cooling end temperature exceeds 330° C., the initial martensite fraction is low and high hole expansion ratio cannot be obtained. A lower limit of the secondary cooling end temperature is more preferably 290° C. and an upper limit of the secondary cooling end temperature is more preferably 320° C. If the average cooling rate during the secondary cooling is less than 10° C./s, a ferrite/bainite phase or the like may be formed during cooling, resulting in a decrease in strength and making it difficult to finally secure a desired microstructure.

Reheating Process and Hot-Dip Galvanizing Process

The cooled steel sheet is reheated at a temperature in a range of 380° C. to 460° C. at a temperature increase rate of 5° C./s or less to temper the martensite obtained in the previous step, induce bainite transformation, and concentrate carbon in untransformed austenite adjacent to bainite. Here, it is important to control a reheating temperature to 380 to 460° C., and if reheating temperature is lower than 380° C. or exceeds 460° C., the amount of phase transformation of bainite is small, so too much fresh martensite is formed in a final cooling process, significantly hurting elongation and hole expansion ratio. A lower limit of the reheating temperature is more preferably 440° C. and an upper limit of the reheating temperature is more preferably 440° C. When the temperature increase rate during reheating exceeds 5° C./s, tempering of the martensite phase formed during the secondary cooling may be insufficient and there may be a possibility of not sufficiently obtaining bainite phase transformation during the temperature increase.

After reheating, hot-dip galvanizing may be performed at a temperature in a range of 430° C. to 490° C., annealing for alloying may be performed as necessary, and then cooling may be performed to room temperature. Thereafter, a process of performing temper rolling less than 1% may be performed to correct the shape of the steel sheet and adjust yield strength.

MODE FOR INVENTION

Example

Hereinafter, the present disclosure will be described in more detail through examples. However, it should be noted that the following examples are for illustrative purposes only and are not intended to limit the scope of the present disclosure. This is because the scope of the present disclosure is determined by matters described in the claims and matters reasonably inferred therefrom.

After preparing the slab having the alloy composition of Table 1, a cold rolled steel sheet was manufactured through heating the steel slab under the conditions described in Tables 2 and 3—hot rolling—cooling—coiling—cold rolling—continuous annealing—primary and secondary cooling—reheating. Meanwhile, the FDT shown in Tables 2 and 3 below refer to a finish delivery temperature, CT refers to a hot-rolled coiling temperature, SS refers to a continuous annealing temperature, SCS refers to a primary cooling end temperature, RCS refers to secondary cooling end temperature, and RHS refers to a reheating temperature.

After measuring a microstructure, mechanical properties, and maximum LME crack size for the prepared cold rolled steel sheet, the results are shown in Table 3 below.

As for the maximum LME crack size is, a sample was spot-welded under severe conditions of dome radius 6 mm, pressing force 3.54 kN, welding time 234 ms, H/T 100 ms, tilting 5 degrees, and gap 1.0 mm, a certain cross section across a nugget was taken, and a maximum length of an existing LME crack was then measured.

A type and fraction of the microstructure were measured through XRD peak analysis in the case of retained austenite, and the fractions of the remaining fresh martensite, ferrite, cementite, bainite and tempered martensite phase were measured through a scanning electron microscope EBSD analysis.

TABLE 1

| Steel type | Alloy composition (wt %) | | | | | | | | | | | | | | | |
|---|---|---|---|---|---|---|---|---|---|---|---|---|---|---|---|---|
| | C | Si | Mn | Cr | Al | Ti | B | P | S | Cu | Ni | Mo | Nb | V | N | C + (Si + Al)/5 |
| A | 0.17 | 0.726 | 2.58 | 0.499 | 0.053 | 0.019 | 0.0018 | 0.009 | 0.006 | 0.02 | 0.00 | 0.058 | 0.003 | 0.003 | 0.0045 | 0.33 |
| B | 0.173 | 0.544 | 2.76 | 0.018 | 0.052 | 0.019 | 0.0019 | 0.010 | 0.003 | 0.01 | 0.02 | 0.062 | 0.004 | 0.002 | 0.0065 | 0.29 |
| C | 0.17 | 0.525 | 2.6 | 0.5 | 0.205 | 0.019 | 0.0019 | 0.006 | 0.002 | 0.03 | 0.01 | 0.063 | 0.001 | 0.005 | 0.0034 | 0.32 |
| D | 0.162 | 0.501 | 2.5 | 0.47 | 0.450 | 0.018 | 0.0018 | 0.007 | 0.004 | 0.02 | 0.01 | 0.062 | 0.001 | 0.003 | 0.0077 | 0.35 |
| E | 0.155 | 0.74 | 2.66 | 0.52 | 0.045 | 0.02 | 0.0019 | 0.007 | 0.004 | 0.01 | 0.02 | 0.061 | 0.004 | 0.005 | 0.0090 | 0.31 |
| F | 0.237 | 0.696 | 2.4 | 0.48 | 0.043 | 0.018 | 0.0018 | 0.009 | 0.003 | 0.01 | 0.01 | 0.057 | 0.001 | 0.004 | 0.0088 | 0.38 |
| G | 0.182 | 0.72 | 3.58 | 0.514 | 0.048 | 0.022 | 0.0021 | 0.012 | 0.004 | 0.05 | 0.01 | 0.008 | 0.003 | 0.003 | 0.0072 | 0.34 |
| H | 0.18 | 0.73 | 1.67 | 2.560 | 0.053 | 0.02 | 0.002 | 0.006 | 0.003 | 0.02 | 0.01 | 0.015 | 0.001 | 0.001 | 0.0047 | 0.34 |
| I | 0.184 | 0.74 | 2.87 | 0.502 | 0.053 | 0.02 | 0.0019 | 0.006 | 0.006 | 0.03 | 0.01 | 0.005 | 0.004 | 0.004 | 0.0042 | 0.34 |
| J | 0.181 | 0.72 | 3.17 | 0.492 | 0.050 | 0.02 | 0.0021 | 0.004 | 0.006 | 0.03 | 0.01 | 0.006 | 0.002 | 0.002 | 0.0067 | 0.34 |
| K | 0.2 | 0.512 | 2.95 | 0.506 | 0.200 | 0.023 | 0.0022 | 0.008 | 0.004 | 0.04 | 0.01 | 0.008 | 0.002 | 0.004 | 0.0064 | 0.34 |
| L | 0.184 | 0.52 | 3.14 | 0.494 | 0.202 | 0.019 | 0.0020 | 0.007 | 0.003 | 0.01 | 0.00 | 0.009 | 0.002 | 0.004 | 0.0054 | 0.33 |
| M | 0.177 | 1.54 | 2.63 | 0.51 | 0.055 | 0.022 | 0.0022 | 0.009 | 0.003 | 0.01 | 0.00 | 0.057 | 0.003 | 0.002 | 0.0046 | 0.50 |

TABLE 2

| Classification | Steel type | Slab heating temperature (° C.) | Hot rolled thickness (mm) | FDT (° C.) | Average cooling rate after hot rolling (° C./s) | CT (° C.) | Cold rolled thickness (mm) | Cold rolling reduction ratio (%) |
|---|---|---|---|---|---|---|---|---|
| Comparative Example 1 | A | 1196 | 2.4 | 955 | 58 | 556 | 1.4 | 42 |
| Comparative Example 2 | B | 1210 | 2.5 | 935 | 661 | 545 | 1.6 | 36 |
| Comparative Example 3 | C | 1203 | 1.8 | 932 | 48 | 607 | 0.9 | 50 |
| Comparative Example 4 | D | 1221 | 2.0 | 942 | 35 | 633 | 1.0 | 50 |
| Comparative Example 5 | E | 1244 | 2.4 | 938 | 55 | 522 | 1.4 | 42 |
| Comparative Example 6 | F | 1189 | 2.1 | 966 | 56 | 525 | 1.2 | 43 |
| Comparative Example 7 | G | 1202 | 2.3 | 952 | 47 | 565 | 1.4 | 39 |
| Comparative Example 8 | H | 1234 | 2.5 | 922 | 55 | 545 | 1.5 | 40 |
| Comparative Example 9 | I | 1231 | 2.5 | 925 | 61 | 567 | 1.6 | 36 |
| Comparative Example 10 | J | 1198 | 2.7 | 945 | 66 | 552 | 1.8 | 33 |
| Inventive Example 1 | K | 1212 | 2.2 | 949 | 58 | 555 | 1.2 | 45 |
| Inventive Example 2 | L | 1248 | 2.1 | 930 | 57 | 565 | 1.2 | 43 |
| Comparative Example 11 | M | 1245 | 2.5 | 947 | 49 | 552 | 1.6 | 36 |

TABLE 3

| Classification | Steel type | SS (° C.) | Average cooling rate for primary cooling (° C./s) | SCS (° C.) | Average cooling rate for secondary cooling (° C./s) | RCS (° C.) | RHS (° C.) | Reheating rate (° C./s) |
|---|---|---|---|---|---|---|---|---|
| Comparative Example 1 | A | 859 | 2.6 | 685 | 19.2 | 306 | 421 | 0.7 |
| Comparative Example 2 | B | 861 | 3.9 | 637 | 18.6 | 315 | 418 | 1.4 |
| Comparative Example 3 | C | 862 | 3.9 | 620 | 16.1 | 323 | 417 | 0.7 |

TABLE 3-continued

| Classification | Steel type | SS (° C.) | Average cooling rate for primary cooling (° C./s) | SCS (° C.) | Average cooling rate for secondary cooling (° C./s) | RCS (° C.) | RHS (° C.) | Reheating rate (° C./s) |
|---|---|---|---|---|---|---|---|---|
| Comparative Example 4 | D | 857 | 4.2 | 577 | 12.9 | 322 | 445 | 0.9 |
| Comparative Example 5 | E | 846 | 3.9 | 605 | 15.5 | 319 | 431 | 1.8 |
| Comparative Example 6 | F | 847 | 4.4 | 595 | 17.0 | 301 | 422 | 0.9 |
| Comparative Example 7 | G | 860 | 5.0 | 587 | 17.8 | 297 | 424 | 2.6 |
| Comparative Example 8 | H | 847 | 3.7 | 622 | 17.4 | 302 | 413 | 0.8 |
| Comparative Example 9 | I | 847 | 2.4 | 675 | 15.6 | 343 | 417 | 0.6 |
| Comparative Example 10 | J | 857 | 3.4 | 633 | 14.5 | 347 | 422 | 1.2 |
| Inventive Example 1 | K | 840 | 4.0 | 607 | 17.6 | 302 | 416 | 1.5 |
| Inventive Example 2 | L | 848 | 3.6 | 612 | 16.1 | 295 | 415 | 1.8 |
| Comparative Example 11 | M | 842 | 4.1 | 606 | 17.6 | 301 | 445 | 3.1 |

TABLE 4

| Classification | Steel type | YS (MPa) | TS (MPa) | EL (%) | YR | HER (%) | Fraction of retained austenite (area %) | Fraction of fresh martensite (area %) | Fraction of ferrite (area %) | Fraction of cementite (volume %) | Maximum LME crack (μm) |
|---|---|---|---|---|---|---|---|---|---|---|---|
| Comparative Example 1 | A | 940 | 1126 | 10.8 | 0.83 | 32.7 | 5% | 5% | 1% | 1 | 80 |
| Comparative Example 2 | B | 962 | 1102 | 10.4 | 0.87 | 33.7 | 4% | 3% | 0% | 2 | 69 |
| Comparative Example 3 | C | 898 | 1139 | 9.7 | 0.79 | 22.1 | 4% | 15% | 3% | 2 | 60 |
| Comparative Example 4 | D | 959 | 1086 | 11.3 | 0.88 | 51.1 | 5% | 0% | 2% | 2 | 87 |
| Comparative Example 5 | E | 978 | 1152 | 11.3 | 0.85 | 28.4 | 5% | 5% | 0% | 1 | 77 |
| Comparative Example 6 | F | 963 | 1232 | 9.6 | 0.78 | 22.4 | 5% | 10% | 1% | 1 | 107 |
| Comparative Example 7 | G | 744 | 1304 | 10.0 | 0.57 | 10.9 | 4% | 20% | 4% | 1 | 76 |
| Comparative Example 8 | H | 1092 | 1253 | 12.2 | 0.87 | 25.6 | 6% | 8% | 0% | 1 | 65 |
| Comparative Example 9 | I | 779 | 1239 | 10.6 | 0.63 | 17.2 | 7% | 19% | 2% | 1 | 71 |
| Comparative Example 10 | J | 917 | 1193 | 9.8 | 0.77 | 16.6 | 5% | 17% | 1% | 1 | 77 |
| Inventive Example 1 | K | 919 | 1181 | 11.0 | 0.78 | 36.5 | 4% | 5% | 0% | 2 | 66 |
| Inventive Example 2 | L | 839 | 1235 | 11.3 | 0.68 | 37.9 | 5% | 10% | 1% | 2 | 69 |
| Comparative Example 11 | M | 1042 | 1195 | 15.2 | 0.87 | 41.1 | 9% | 3% | 0% | 0 | 149 |

First, Comparative Examples 1 to 5 are cases in which steel types A to E were applied, respectively. Steel types A to E have the contents of C, Mn, or Cr lower than that of the range of the present disclosure, in which strength of TS 1180 MPa class could not be obtained. Even for steels, like steel types A to E, in which the alloy component addition amount is outside of the range of the components of the present disclosure, tensile strength higher than 1180 MPa may be obtained if annealing heat treatment conditions are significantly changed, but in this case, it is necessity to introduce an excessively large amount of fresh martensite and a high hole expansion ratio cannot be obtained. Comparative Example 6 is a case to which steel type F having a C content exceeding the range of the present disclosure was applied, in which a high hole expansion ratio could not be obtained even if the process conditions suggested in the present disclosure were satisfied.

Steel type G of Comparative Example 7 is a case in which the Mn content exceeds the range of the present disclosure, whereby a ratio of fresh martensite reaches 20%, so that a hole expansion ratio is significantly deteriorated and a yield ratio is also too low. In addition, steel type H of Comparative Example 8 was a steel type in which Cr was increased instead of Mn, and it was difficult to obtain a low yield ratio.

To Comparative Examples 9 and 10, steel types I and J satisfying the alloy composition of the present disclosure were applied, but as an annealing and quenching temperature exceeded 330° C., the ratio of fresh martensite increased and a hole expansion ratio was significantly deteriorated.

Inventive Examples 1 and 2 are cases to which steel types K and L satisfying the alloy composition of the present disclosure are applied and in which all process conditions are satisfied, and here, a hole expansion ratio of 25% or more and elongation suitable for processing of 5% to 13% may be obtained at a low yield ratio of 0.65 to 0.85.

Steel types F and M applied to Comparative Examples 6 and 11, respectively, have an alloy amount that does not satisfy Equation 1, and due to this, it can be seen that a maximum size of the LME crack in the weld portion exceeded 100 μm, and thus, LME crack resistance was inferior.

Meanwhile, cracks in an overlapping portion, which are not allowed to exist as severe LME cracks, were not present in all of the test materials.

While exemplary embodiments have been shown and described above, it will be apparent to those skilled in the art that modifications and variations could be made without departing from the scope of the present disclosure as defined by the appended claims.

The invention claimed is:

1. A cold rolled steel sheet comprising:
by weight percent (wt %), 0.17 to 0.21% of carbon (C), 0.3 to 0.8% of silicon (Si), 2.7 to 3.3% of manganese (Mn), 0.3 to 0.7% of chromium (Cr), 0.01 to 0.3% of aluminum (Al), 0.01 to 0.03% of titanium (Ti), 0.001 to 0.003% of boron (B), 0.04% or less of phosphorus (P), 0.02% or less of sulfur (S), 0.01% or less of nitrogen (N), and a balance of iron (Fe) and other inevitable impurities, wherein the contents of carbon (C), silicon (Si), and aluminum (Al) satisfy Equation 1 below, $$[C]+([Si]+[Al])/5 \leq 0.35\%$$ [Equation (1)]

wherein [C], [Si], [Al] refer to weight percents of C, Si, and Al, respectively; and a microstructure consisting of: by area fraction, 3 to 7% of retained austenite, 5 to 15% of fresh martensite, and 5% or less (including 0%) of ferrite; by volume fraction, 1 to 3% of a cementite phase as a precipitate; and a balance of bainite or tempered martensite, wherein the cementite phase is distributed at least one of between laths of the bainite, in laths of the tempered martensite, and in a grain boundary of the tempered martensite.

2. The cold rolled steel sheet of claim 1, wherein the cold rolled steel sheet further includes 0.1% or less of copper (Cu), 0.1% or less of nickel (Ni), and 0.1% or less of molybdenum (Mo).

3. The cold rolled steel sheet of claim 1, wherein the cold rolled steel sheet further includes 0.03% or less of niobium (Nb) and 0.01% or less of vanadium (V).

4. The cold rolled steel sheet of claim 1, wherein the cold rolled steel sheet has a tensile strength of 1180 MPa or more, a yield ratio of 0.65 to 0.85, a hole expansion ratio of 25% or more (HER), and an elongation of 5 to 13%.

5. A hot-dip galvanized steel sheet comprising: the cold rolled steel sheet of claim 1 and a hot-dip zinc plating layer on a surface thereof.

\* \* \* \* \*